UNITED STATES PATENT OFFICE.

HUGH C. SICARD, OF BUFFALO, NEW YORK, ASSIGNOR TO UNITED STATES FERRO-ALLOYS CORPORATION, OF NEW YORK, N. Y., A CORPORATION OF NEW YORK.

PROCESS FOR PRODUCING LOW-CARBON FERROTITANIUM.

1,374,036.     Specification of Letters Patent.     Patented Apr. 5, 1921.

No Drawing.     Application filed August 18, 1919. Serial No. 318,329.

*To all whom it may concern:*

Be it known that I, HUGH C. SICARD, a citizen of the United States of America, residing in the city of Buffalo, county of Erie, and State of New York, have invented certain new and useful Improvements in Processes for Producing Low-Carbon Ferrotitanium, of which the following is a full, clear and exact description.

This invention relates to the production of low-carbon ferro-titanium and comprises certain novel steps by which that material can be produced.

In carrying out my invention I preferably use an electric furnace of the covered type such as those employed in the manufacture of steel. Into this furnace is introduced a mixture of titaniferous ore, scrap iron and a carbonaceous reducing agent, the last named being present in sufficient quantity to reduce the titanic oxid in the titaniferous ore to titanium and to reduce the iron oxid to metallic iron. In general the titaniferous ore will contain enough impurities to form a fusible slag, but in case this is not so, as, for example, when the mixture consists of pure rutile, scrap iron and carbon, slag forming materials such as silica or burnt lime are added to the charge. When the reaction is complete the furnace contains a molten bath of ferro-titanium with a carbon content of from 6% to 8%, (really a double carbid of iron and titanium) covered with a layer of molten slag. The current is now cut off, the electrodes are raised clear of the bath and all the slag is skimmed off the top of the metallic bath with a wooden rake so that the furnace now contains simply the molten ferro-titanium cleaned from slag. Aluminum is now added in the form of small bars or shot, while the bath is stirred by means of a rod and at the same time is allowed to cool slowly. This treatment causes the carbon contained in the molten ferro-titanium to separate in the graphitic state in the form called "kish," which floats on the bath and is skimmed off with the wooden rake as was before done in the case of the slag. When the molten bath is approaching the temperature of solidification and all the "kish" has been skimmed off, a slag of carbid of calcium or simply of burnt lime is introduced into the furnace in such a quantity that it will form a blanket over the surface of the bath, and the electric current is switched on, and the electrodes at the same time are lowered into the furnace. The heating is then continued until the bath becomes sufficiently fluid for tapping into chilled molds whereupon a ferro-titanium of low-carbon content is obtained.

Having thus described my invention, what I claim is:

1. The process of producing low-carbon ferro-titanium comprising the formation of a double carbid of iron and titanium containing a high percentage of carbon, then treating the molten bath of this material with aluminum so as to cause the separation of the carbon in the graphitic form, then skimming off this carbon then reheating the molten bath and then casting the resulting product.

2. The process of producing low-carbon ferro-titanium comprising the reduction in an electric furnace of a mixture of titaniferous ore, scrap iron and a sufficient quantity of a carbonaceous reducing agent to reduce the titanic oxid in the ore and the iron oxid in the scrap iron to a metallic form, then treating the molten bath of this material with aluminum so as to cause the separation of the carbon in the graphitic form, then skimming off this carbon, then reheating the molten bath and then casting the resulting product.

3. The process of producing low-carbon ferro-titanium comprising the reduction in an electric furnace of a mixture of rutile, scrap iron and a sufficient quantity of a carbonaceous reducing agent to reduce the titanic oxid in the ore and the iron oxid in the scrap iron to a metallic form, then adding to the charge a slag forming material, then treating the molten bath of this material with aluminum so as to cause the separation of the carbon in the graphitic form, then skimming off this carbon, then reheating the molten bath and then casting the resulting product.

4. The process of producing low-carbon ferro-titanium comprising the formation of a double carbid of iron and titanium containing a high percentage of carbon, then treating the molten bath of this material with aluminum so as to cause the separation of the carbon in the graphitic form, then skimming off this carbon, then introducing into the furnace a slag of carbid of calcium in such a quantity that it will form a blanket over the surface of the bath, then reheating the molten bath and then casting the resulting product.

5. The process of producing low-carbon ferro-titanium comprising the formation of a double carbid of iron and titanium containing a high percentage of carbon, then treating the molten bath of this material with aluminum so as to cause the separation of the carbon in the graphitic form then skimming off this carbon then reheating the molten bath and then casting the resulting product into chilled molds.

In testimony whereof, I have hereunto signed my name.

HUGH C. SICARD.